(12) United States Patent
Kobayashi

(10) Patent No.: US 8,780,260 B2
(45) Date of Patent: Jul. 15, 2014

(54) IMAGING DEVICE, FILTER HOLDING MEMBER, AND FILTER MOUNTING METHOD FOR IMAGING DEVICE

(75) Inventor: Motoaki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 4 days.

(21) Appl. No.: 13/553,065

(22) Filed: Jul. 19, 2012

(65) Prior Publication Data
US 2013/0027601 A1    Jan. 31, 2013

(30) Foreign Application Priority Data
Jul. 27, 2011  (JP) ................. 2011-164319

(51) Int. Cl.
*H04N 5/225*       (2006.01)
(52) U.S. Cl.
USPC ................ 348/360; 348/342; 348/335
(58) Field of Classification Search
None
See application file for complete search history.

(56) References Cited

U.S. PATENT DOCUMENTS

| | | | | | |
|---|---|---|---|---|---|
| 3,057,278 | A | * | 10/1962 | Zill | 396/94 |
| 4,063,263 | A | * | 12/1977 | Krewalk, Sr. | 396/494 |
| 4,092,656 | A | * | 5/1978 | Lang et al. | 396/301 |
| 4,478,492 | A | * | 10/1984 | Ando | 359/828 |
| 7,753,603 | B2 | * | 7/2010 | Kawai | 396/530 |

FOREIGN PATENT DOCUMENTS

JP    2008-259118    10/2008

\* cited by examiner

*Primary Examiner* — Twyler Haskins
*Assistant Examiner* — Angel L Garces-Rivera
(74) *Attorney, Agent, or Firm* — Frommer Lawrence & Haug LLP; William S. Frommer

(57) ABSTRACT

Provided is an imaging device including an image sensor, and an engagement member which is an annular or cylindrical member provided between a lens mount unit and a first optical filter fixedly installed on a subject side of the image sensor, and has a second uneven portion formed in an inner circumferential direction, the second uneven portion having a shape corresponding to a first uneven portion formed on an outer periphery of a filter holding member for holding a second optical filter, and being for engaging the filter holding member in an attachable/detachable manner.

7 Claims, 9 Drawing Sheets

(a)

(b)

IMAGING DEVICE, FILTER HOLDING MEMBER, AND FILTER MOUNTING METHOD FOR IMAGING DEVICE

BACKGROUND

The present disclosure relates to an imaging device, a filter holding member, and a filter mounting method for the imaging device.

For example, with an imaging device such as a movie camera, a replaceable filter such as a neutral density (ND) filter, a color compensating (CC) filter, or a cross filter is sometimes used. Such a replaceable filter is used as necessary depending on the conditions for capturing an image, a desired image, and the like.

As a method of mounting such a replaceable filter on an imaging device, there is a method of mounting, in an attachable/detachable manner, the filter at the front of a lens, i.e. on the side of a subject. When using this method, a matte box on which the filter is attached is mounted at the front of the lens, for example. There is also a method of installing a mechanism for switching a replaceable filter, such as a filter turret, at the front of an image sensor inside an imaging device. JP 2008-259118A discloses a technology for realizing miniaturization of a device and enhancing the operability by improving such a mechanism.

SUMMARY

However, in the case of mounting a replaceable filter at the front of a lens, since the inside diameter of a lens barrel at the portion is large, the size of the filter will also be large. Also, mounting of a matte box is sometimes restricted, as in the case of capturing a three-dimensional image by using two imaging devices, for example, and it is difficult to use a replaceable filter in such a case.

Furthermore, with respect to installation of a mechanism for switching a replaceable filter within an imaging device, there is a limit to miniaturization of the imaging device even with the technology of JP 2008-259118A. Also, only filters mounted on the mechanism in advance can be used as the replaceable filter, and a user is not able to freely select a filter.

Accordingly, the present disclosure proposes an imaging device, a filter holding member, and a filter mounting method for the imaging device which are novel and improved, and which enable to more freely use a replaceable filter.

According to the present disclosure, there is provided an imaging device which includes an image sensor, and an engagement member which is an annular or cylindrical member provided between a lens mount unit and a first optical filter fixedly installed on a subject side of the image sensor, and has a second uneven portion formed in an inner circumferential direction, the second uneven portion having a shape corresponding to a first uneven portion formed on an outer periphery of a filter holding member for holding a second optical filter, and being for engaging the filter holding member in an attachable/detachable manner.

Also, according to the present disclosure, there is provided a filter holding member which includes a filter holding portion for holding an optical filter, and an engagement portion which is to be connected to the filter holding portion, whose first uneven portion formed on an outer periphery has a shape corresponding to a second uneven portion formed in an inner circumferential direction of an annular or cylindrical engagement member provided between a lens mount unit and a first optical filter fixedly installed on a subject side of an image sensor of an imaging device, and which is to be engaged with the second uneven portion in an attachable/detachable manner.

Furthermore, according to the present disclosure, there is provided a filter mounting method for an imaging device, which includes inserting, between a lens mount unit and a first optical filter fixedly installed on a subject side of an image sensor of an imaging device, a filter holding member holding a second optical filter, the filter holding member being inserted in an optical axis direction from a side of the lens mount unit with the second optical filter facing the image sensor, and causing a second uneven portion formed on an outer periphery of the filter holding member to be engaged, in an attachable/detachable manner, with a first uneven portion formed in an inner circumferential direction of an annular or cylindrical engagement member provided between the first optical filter and the lens mount unit.

According to the present disclosure, a replaceable filter (a second optical filter) is easily mounted on an engagement member between an image sensor and a lens mount unit by an engagement structure between an uneven portion formed in the inner circumferential direction of the engagement member and a filter holding member. Also, according to the present disclosure, the filter holding member holding a replaceable filter is mounted by being inserted from the side of the lens mount unit of the imaging device, that is, from the outside. Accordingly, a filter to be held by the filter holding member can be freely exchanged.

As described above, according to the present disclosure, it is possible to more freely use a replaceable filter.

DETAILED DESCRIPTION OF THE EMBODIMENT(S)

Figure 1:
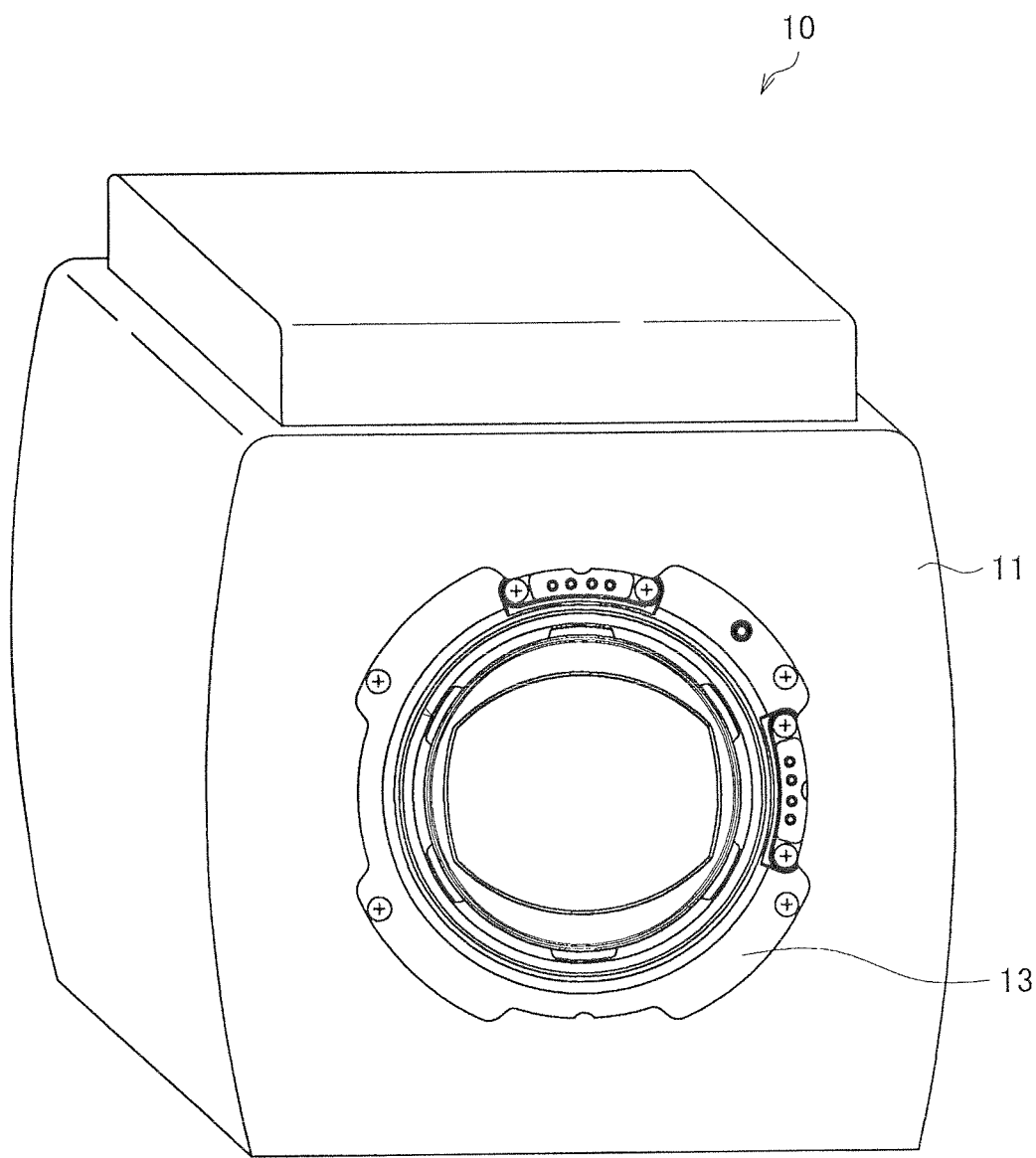
FIG. 1 is a diagram showing an overall configuration of an imaging device according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, the explanation will be given in the following order.

1. Overview of Imaging Device
2. Overview of Filter Holding Member
3. Details of Filter Mounting Method
4. Supplement In the following description, first, schematic configurations of an imaging device and a filter holding member according to an embodiment of the present disclosure will be described. Then, details of a method of mounting a replaceable filter on the imaging device using the filter holding member will be given, and also, the configurations of the imaging device and the filter holding member will be described in greater detail.

(1. Overview of Imaging Device)

First, a schematic configuration of an imaging device according to an embodiment of the present disclosure will be described with reference to FIGS. 1 to 3.

(Overall Configuration of Imaging Device)

FIG. 1 is a diagram showing an overall configuration of an imaging device according to an embodiment of the present disclosure. An imaging device 10 according to an embodiment of the present disclosure is a device that captures an image of a subject, and that records as digital image data, in a recording medium, a video or a still image obtained by image capturing. In the illustrated example, the imaging device 10 is realized as a movie camera, but it may be realized as any device that captures a video or a still image.

As shown in FIG. 1, the imaging device 10 includes a casing 11, and a lens mount unit 13 provided at the front of the easing 11, i.e. on the subject side. An arbitrary lens unit is attached to the lens mount unit 13. The imaging device 10 performs image capturing, with a lens unit attached to the lens mount unit 13. A subject image that enters through the lens of the lens unit passes through the lens mount unit 13 from a lens barrel of the lens unit, and is guided to an image sensor within the casing 11. The image sensor photoelectrically converts the subject image, and outputs an image signal representing the captured image.

Additionally, the configuration of the lens unit to be attached to the lens mount unit 13 and the circuit configuration of an image processing circuit or the like, embedded in the casing 11, for processing the image signal output from the image sensor will not be described in detail here, because they can take the form of various configurations that can be used for known imaging devices.

(Configuration Between Lens Mount Unit and Image Sensor)

Figure 2:
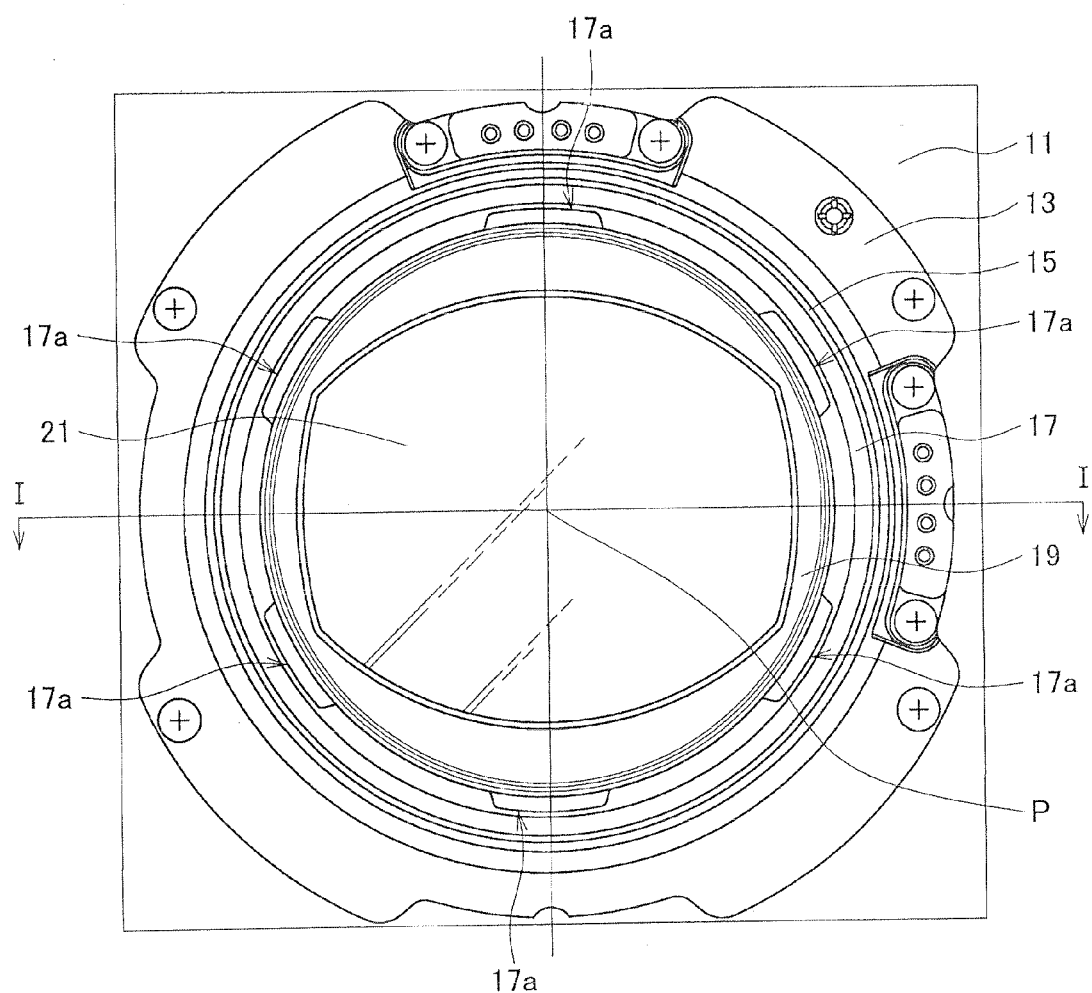
FIG. 2 is a diagram showing a configuration of a lens mount unit of an imaging device and its vicinity according to an embodiment of the present disclosure.
Figure 3:
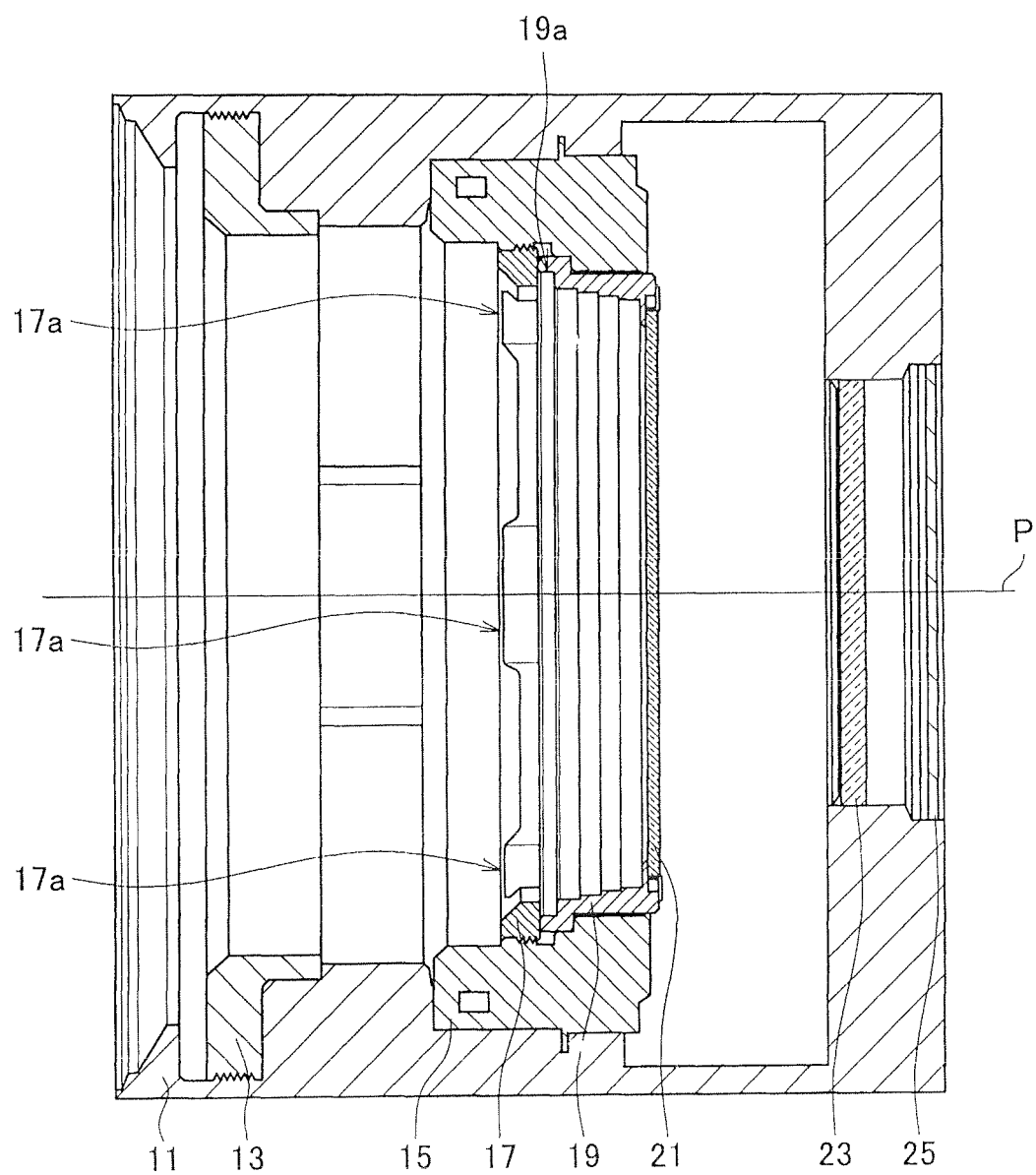
FIG. 3 is a cross-sectional view along the I-I line of the lens mount unit of the imaging device and its vicinity shown in FIG. 2.

FIG. 2 is a diagram showing a configuration of a lens mount unit of an imaging device and its vicinity according to an embodiment of the present disclosure. FIG. 3 is a cross-sectional view along the I-I line of the lens mount unit of the imaging device and its vicinity shown in FIG. 2. As shown in FIGS. 2 and 3, a substrate 15, a retaining member 17, a fixed filter frame 19, a bandpass filter 21, and a low-pass filter 23 are provided between the lens mount unit 13 provided at the front of the casing 11 of the imaging device 10 and an image sensor 25 provided within the casing 11. Additionally, P is an optical axis.

Moreover, in the following, in describing each member provided between the lens mount unit 13 and the image sensor 25, an explanation will be given, taking the lens mount unit 13 side, i.e. the subject side, as the front, and the image sensor 25 side as the rear.

As described above, the lens mount unit 13 is a member to which a lens unit is attached. In the illustrated example, the lens mount unit 13 is a lens mount unit according to a lens mount system called PL mount, but it is not limited to such and may be a lens mount unit of any system.

The substrate 15 is also called an optical head block (OHB) base, and is a substrate stationary fixed to the casing 11 to support the retaining member 17 and the fixed filter frame 19. In the illustrated example, the retaining member 17 and the fixed filter frame 19 are stationary fixed to the substrate 15 by the fixed filter frame 19 being fitted to an opening of the substrate 15 that narrows from the front to the rear, and then the retaining member 17 being screwed into the substrate 15 from the front.

The retaining member 17 is an annular member for being screwed into the substrate 15 and stationary fixing the fixed filter frame 19, as described above. A screw portion having a shape corresponding to the inner peripheral surface of the substrate 15 is provided on the outer peripheral surface of the retaining member 17. On the other hand, a notch 17a is formed on the inner peripheral surface of the retaining member 17. In the illustrated example, six notches 17a are formed at equal distances in the circumferential direction. The function of the notches 17a will be described later. At the part other than the notches 17a, the inside diameter of the retaining member 17 is smaller than the inside diameter of the most anterior part of the fixed filter frame 19.

The fixed filter frame 19 is a short cylindrical member having an opening in the direction of the optical axis P. The fixed filter frame 19 is stationary fixed by being fitted to the opening of the substrate 15 and retained by the retaining member 17 from the front, as described above. The inside diameter of the most anterior part of the fixed filter frame 19 is larger than the part of the retaining member 17 other than the notches 17a. The inside diameter of the fixed filter frame 19 decreases therefrom toward the rear, and, as illustrated, a step that narrows the inside diameter is formed immediately behind the most anterior part, and a groove 19a is thereby formed between the fixed filter frame 19 and the retaining member 17. This groove 19a has its bottom surface formed by the inner peripheral surface of the most anterior part of the fixed filter frame 19, its rear side surface by the surface of the step of the fixed filter frame 19, and its front side surface by the surface of the rear end of the retaining member 17. Additionally, besides the step described above, a step may be provided at a part where the inside diameter of the fixed filter frame 19 narrows. These steps may function as light-shielding lines for preventing a lens flare or the like. The bandpass filter 21 is stationary fixed at the most posterior part of the fixed filter frame 19.

The bandpass filter 21 is a lens for removing, from light entering through the lens, light of unnecessary wave length such as ultraviolet light, infrared light and the like. Also, the low-pass filter 23 removes light in a specific high-frequency range from light which has passed through the bandpass filter 21, and prevents the occurrence of moiré in a captured image. The bandpass filter 21 is stationary fixed by the fixed filter frame, as described above. The low-pass filter 23 is also stationary fixed to the casing 11 by a fixing member which is not illustrated. That is, the bandpass filter 21 and the low-pass filter 23 are optical filters that are fixedly installed at the subject side of the image sensor 25.

Additionally, the configurations and arrangement of these optical filters are not limited to those of the bandpass filter 21 rind the low-pass filter 23 illustrated, and any configuration and any arrangement are allowed. For example, a low-pass filter may be installed at the position of the bandpass filter 21. The number of optical filters may be one or, as in the example described above, more than one. Also, the optical filters may include, besides filters such as the bandpass filter and the low-pass filter, a transparent glass for dust prevention and the like.

The image sensor 25 photoelectrically converts a subject image entered, and outputs an image signal representing a captured image. The image sensor 25 is stationary fixed to the casing 11 by a fixing member, which is not illustrated.

In the foregoing, the configuration between the lens mount unit 13 and the image sensor 25 of the imaging device 10 has been roughly described. Additionally, arrangement and configuration of an optical filter group stationary fixed behind the bandpass filter 21 and configuration of vicinity of the image sensor 25 may be any of various configurations that can be used for known imaging devices, and no detailed description will be given other than the brief description above.

(2. Overview of Filter Holding Member)

Next, a schematic configuration of a filter holding member according to an embodiment of the present disclosure will be described with reference to FIGS. 4 and 5.

(Configuration of Filter Holding Member)

Figure 4:
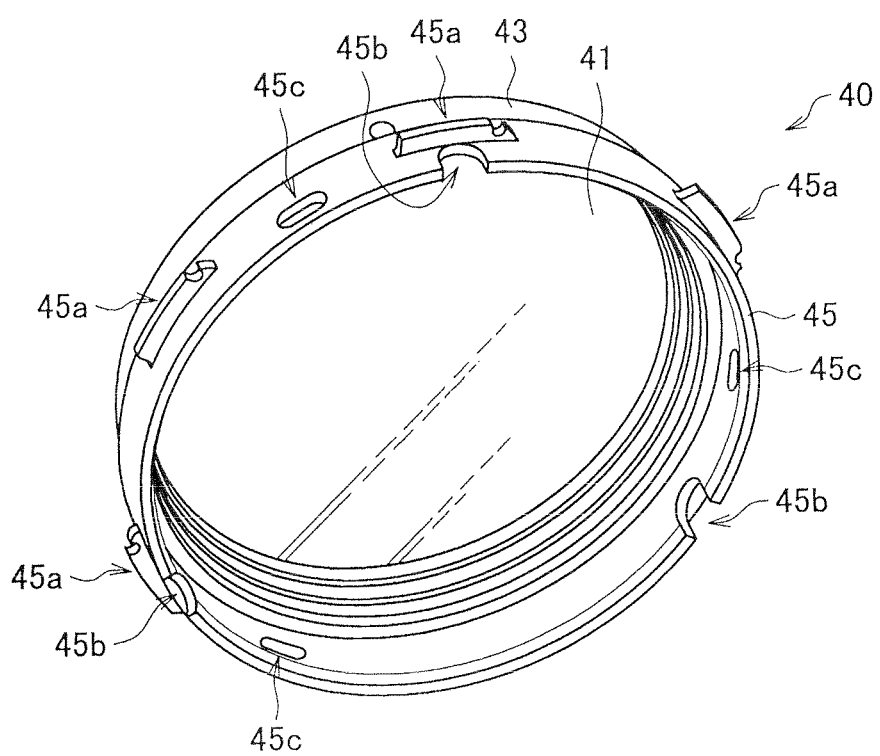
FIG. 4 is a diagram showing a configuration of a filter holding member according to an embodiment of the present disclosure.

FIG. 4 is a diagram showing a configuration of a filter holding member according to an embodiment of the present disclosure. As shown in FIG. 4, a filter holding member 40 according to an embodiment of the present disclosure is a short cylindrical member for holding a filter 41.

The filter holding member 40 includes a filter holding portion 43 for holding the filter 41, and an engagement portion 45 to be engaged, as will be described later, with the imaging device 10. The filter holding portion 43 and the engagement portion 45 may be formed of resin, for example. The filter 41 is used as a replacement filter to be mounted on the imaging device 10 by the filter holding member 40, and may be various filters such as an ND filter, a CC filter, a cross filter and the like. The filter 41 is made of plastic or glass, for example, and is stationary fixed by being fitted to the filter holding portion 43 or by being interposed between the filter holding portion 43 and the engagement portion 45, for example. In the illustrated example, since the filter holding portion 43 and the engagement portion 45 both have an annular or short cylindrical form, the filter 41 is substantially circular.

The engagement portion 45 is a short cylindrical member that is to be connected to the filter holding portion 43. The connection between the filter holding portion 43 and the engagement portion 45 is based on a hook mechanism where a hook portion is provided to the two, for example. As described above, the filter 41 may be interposed between the filter holding portion 43 and the engagement portion 45, and the filter 41 may thereby be stationary fixed.

Here, a convex portion 45a having a shape corresponding to the notch 17a formed on the inner periphery of the retaining member 17 of the imaging device 10 is formed on the outer peripheral surface of the engagement portion 45. Six notches 17a are formed at equal distances in the circumferential direction of the retaining member 17 as described above, and thus, six convex portions 45a are formed at equal distances in the circumferential direction of the engagement portion 45.

Also formed on the peripheral surface of the engagement portion 45 are a notch 45b and an opening 45c for connecting to a jig, which will be described later. In the illustrated example, three notches 45b and three openings 45c are formed at equal distances in the circumferential direction of the engagement portion 45.

(Connection Between Filter Holding Member and Jig)

Figure 5:
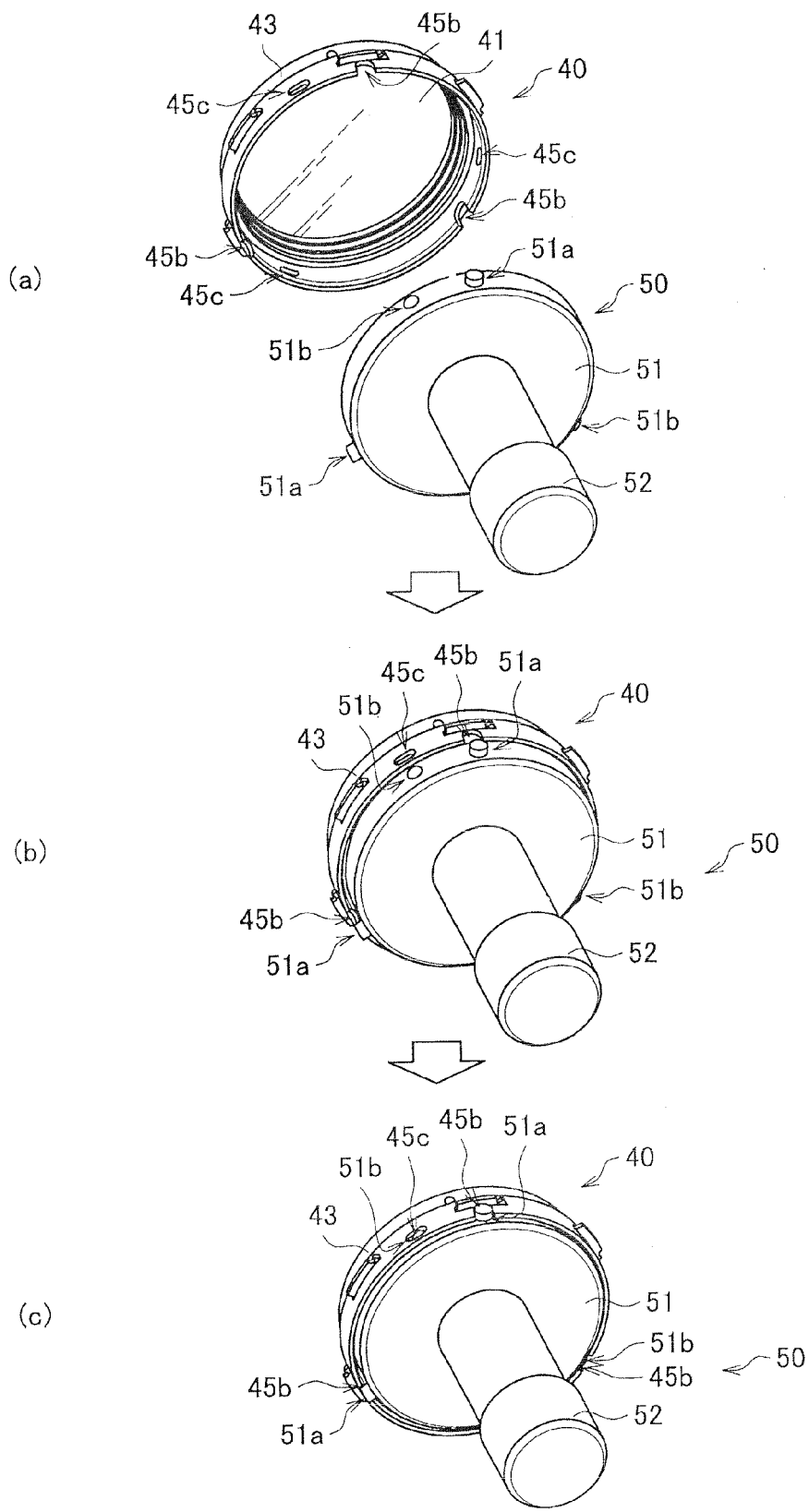
FIG. 5 is a diagram showing connection of a filter holding member and a jig according to an embodiment of the present disclosure.

FIG. 5 is a diagram showing connection of a filter holding member and a jig according to an embodiment of the present disclosure. As shown in FIG. 5, the filter holding member 40 may be connected to a jig 50 at the time of being mounted on the imaging device 10.

The jig 50 includes a disc portion 51 and a handle 52. The disc portion 51 and the handle 52 may be formed of resin, for example. The outside diameter of the disc portion 51 corresponds to the inside diameter of the engagement portion 45 of the filter holding member 40. Also, provided on the outer periphery of the disc portion 51 are a cylindrical convex portion 51a corresponding to the notch 45b formed on the peripheral surface of the engagement portion 45, and a movable ball 51b corresponding to the opening 45c formed on the peripheral surface of the engagement portion 45.

The cylindrical convex portion 51a is formed of metal, for example. Three cylindrical convex portions 51a are formed, correspondingly to the notches 45b, at equal distances in the circumferential direction of the disc portion 51. As shown in (a) to (c) of the drawing, when the disc portion 51 of the jig 50 is inserted into the engagement portion 45 of the filter holding member 40, the cylindrical convex portion 51a is fitted to the notch 45b. The cylindrical convex portion 51a thereby binds, in the state of (c) after insertion, the engagement portion 45 with respect to rotational motion around an axis perpendicular to the filter 41. That is, if the jig 50 is rotated in the state of (c) with the handle 52 as the axis, the filter holding member 40 rotates accordingly to the jig 50.

The movable ball 51b is also formed of metal, for example. Three movable balls 51b are formed, correspondingly to the openings 45c, at equal distances in the circumferential direction of the disc portion 51. The movable ball 51b protrudes from an opening, having a smaller diameter, formed on the outer peripheral surface of the disc portion 51, and is biased in an outward direction from the center of the disc portion 51 by an elastic material such as a spring. As shown in (a) to (c) of the drawing, when the disc portion 51 of the jig 50 is inserted into the engagement portion 45 of the filter holding member 40, the movable ball 51b protrudes again after being temporarily pressed into the disc portion 51 by the peripheral surface of the engagement portion 45, and is fitted to the opening 45c. The connection between the filter holding member 40 and the jig 50 is thereby maintained in the state of (c) after insertion unless another external force is applied to the filter holding member 40.

(3. Details of Filter Mounting Method)

Next, details of a filter mounting method according to an embodiment of the present disclosure will be given with reference to FIGS. 6 to 9.

(Insertion Stage)

Figure 6:
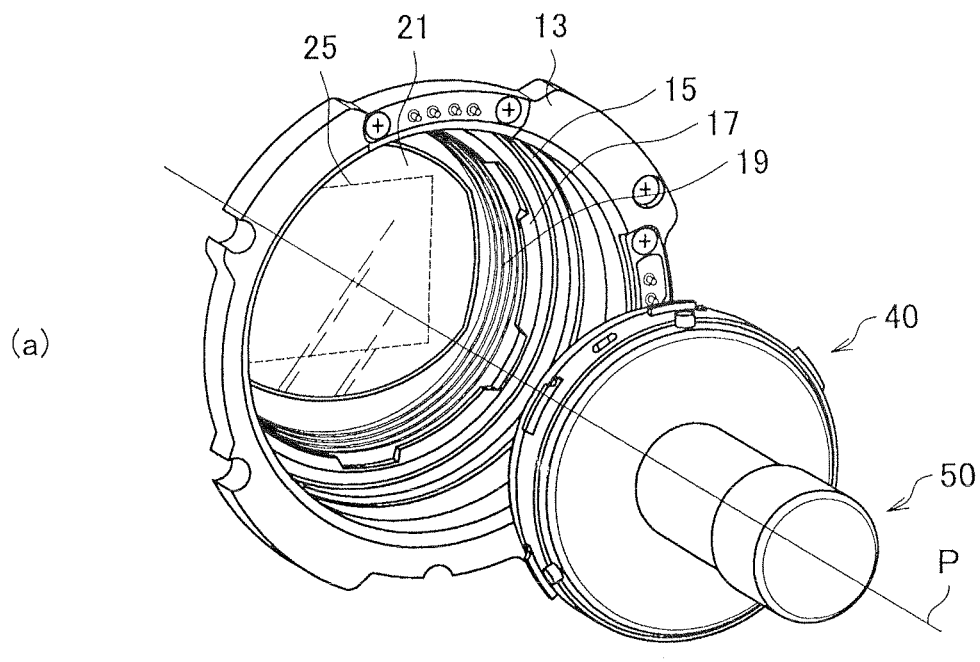
FIG. 6 is a diagram for describing an insertion stage in the mounting of a filter on an imaging device according to an embodiment of the present disclosure.
Figure 6:
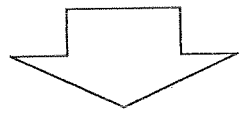
Figure 6:
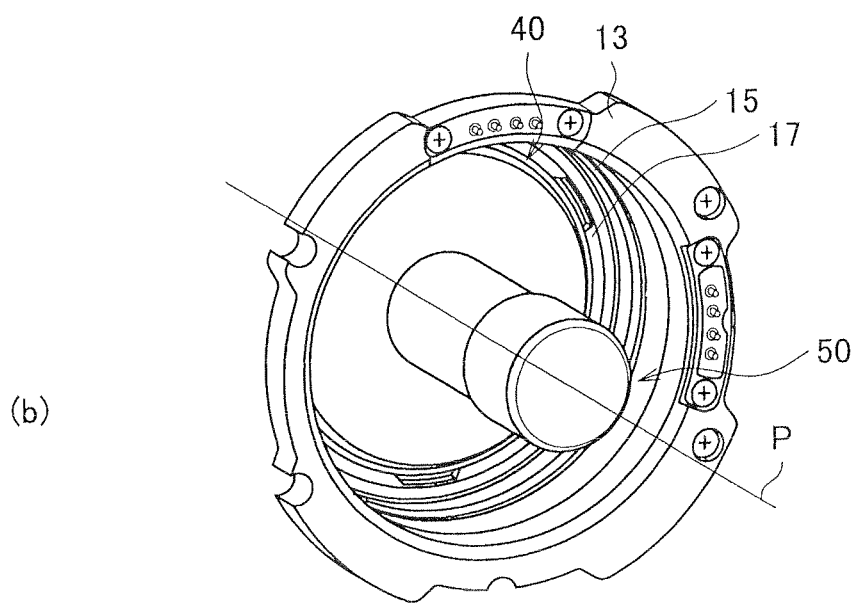

FIG. 6 is a diagram for describing an insertion stage in the mounting of a filter on an imaging device according to an embodiment of the present disclosure. In FIG. 6, insertion of the filter holding member 40 connected to the jig 50 in the direction of the optical axis P from the lens mount unit 13 side of the imaging device 10 is shown in (a) and (h).

At this time, as shown in (a), the filter holding member 40 is inserted with the filter 41 facing the image sensor 25 of the imaging device 10. Taking the direction of the insertion as forward, the filter holding member 40 is moved forward, with the filter holding portion 43 side as the front, by the jig 50 connected to the engagement portion 45 at the back. As will be described later, the filter holding member 40 is inserted into a portion between the lens mount unit 13 and the bandpass filter 21, which is seen from the lens mount unit 13 side to be cylindrical and concave, and by being moved forward by the jig 50 and being inserted as described above, an operation for the insertion is facilitated.

Then, as shown in (b), the filter holding member 40 to be inserted passes through the inside of an annular or cylindrical portion formed by each of the lens mount unit 13, the substrate 15, and the retaining member 17, and is abutted against the fixed filter frame 19, or, more particularly, against a surface of the groove 19a of the fixed filter frame 19, the surface being the one forming the side surface on the image sensor 25 side.

Now, the inside diameter of the annular or cylindrical portion formed by each of the lens mount unit 13 and the substrate 15 is larger than the outside diameter of the portion at which the convex portion 45a of the engagement portion 45 of the filter holding member 40 is formed. Therefore, the filter holding member 40 passes through the annular or cylindrical portion formed by each of the members, regardless of the position of the convex portion 45a.

On the other hand, as described above, the notch 17a is formed in the retaining member 17. When the positions of the notch 17a and the convex portion 45a coincide, the filter holding member 40 can pass through the annular inside of the retaining member 17. This point will be described in detail in the following description of the rotation stage.

(Rotation Stage)

Figure 7:
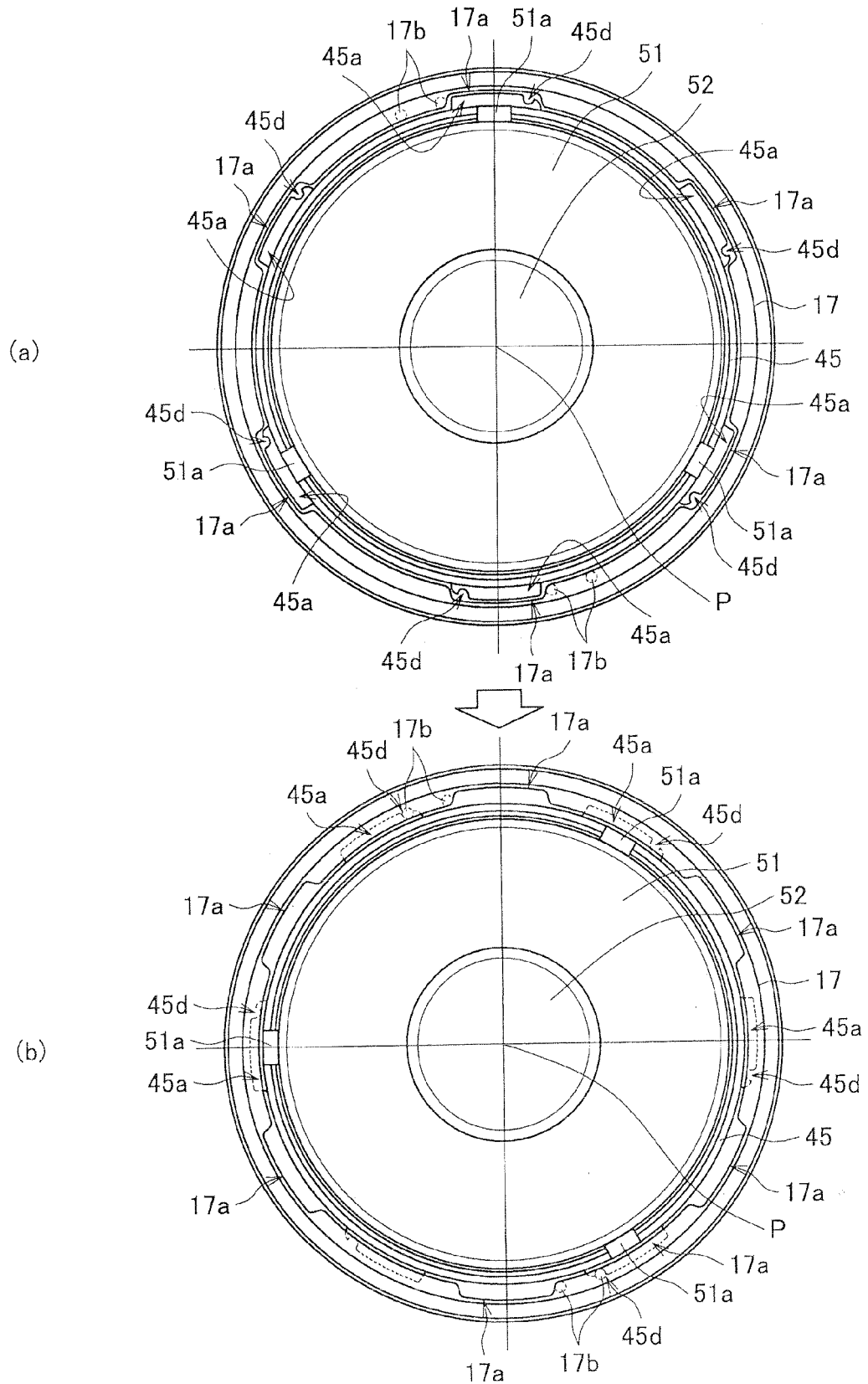
FIG. 7 is a diagram for describing a rotation stage in the mounting of a filter on an imaging device according to an embodiment of the present disclosure.

FIG. 7 is a diagram for describing a rotation stage in the mounting of a filter on an imaging device according to an embodiment of the present disclosure. In FIG. 7, rotation of the filter holding member 40 around the optical axis P after the filter holding member 40 has passed through the annular inside of the retaining member 17 and has been inserted is shown in (a) and (b).

First, as shown in (a), at the time of the filter holding member 40 passing through the annular inside of the retaining member 17 and being inserted, the position of the notch 17a formed on the inner peripheral surface of the retaining member 17 and the position of the convex portion 45a formed on the outer peripheral surface of the engagement portion 45 of the filter holding member 40 are coincident. That is, the convex portion 45a is guided by the notch 17a to the groove 19a behind the notch 17a.

To make this possible, the notch 17a and the convex portion 45a are formed at corresponding positions and with corresponding shapes. In the illustrated example, six notches 17a and six convex portions 45a are formed, and the notches 17a and the convex portions 45a are respectively formed at equal distances in the circumferential direction. Also, each notch 17a and each convex portion 45a correspond to each other in dimensions in the radial direction (the depth of the notch 17a and the height of the convex portion 45a), and in the dimensions in the circumferential direction (the width of the notch 17a and the width of the convex portion 45a).

Here, the notches 17a, and the convex portions 45a, do not have to be arranged at equal distances as long as the notches 17a and the convex portions 45a are arranged correspondingly to each other. Also, the number thereof does not have to be six. Furthermore, paired notch 17a and convex portion 45a do not have to have the same shape as long as there is a correspondence between the two with respect to the shape.

However, as in the illustrated example, in the case a plurality of notches 17a and a plurality of convex portions 45a are arranged, there are a plurality of angles (rotation angles around the optical axis P) at which the filter holding member 40 can be inserted through the inside of the retaining member 17, and thus insertion of the filter holding member 40 can be completed with a little adjustment even if a user inserted the filter holding member 40 with no respect to the angle.

More specifically, if the filter holding member 40 does not pass through the retaining member 17 at the time of insertion because the convex portion 45a of the filter holding member 40 does not coincide with the position of the notch 17a, the user can rotate the filter holding member 40 around the optical axis P using the jig 50. In the case six notches 17a and six convex portions 45a are formed at equal distances, the positions of the notches 17a and the convex portions 45a can be made to coincide by rotation of 60 degrees at the most.

Additionally, since the cylindrical convex portion 51a of the jig 50 and the notch 45b of the filter holding member 40 are fitted together as described above, the filter holding member 40 can be easily rotated around the optical axis P by rotating the jig 50 with the handle 52 as the axis.

Next, when the filter holding member 40 is rotated around the optical axis P as shown in (b) after the filter holding member 40 has passed through the annular inside of the retaining member 17 and has been abutted against the fixed filter frame 19, the position of the convex portion 45a and the position of the notch 17a are skewed relative to each other. That is, the convex portion 45a is fitted to the groove 19a (see FIG. 3) formed by the part of the retaining member 17 other than the notch 17a and the fixed filter frame 19.

The filter holding member 40 is stationary fixed to the imaging device 10 in the state of (b) described above. When the jig 50 is removed from the filter holding member 40, the series of processes for mounting the filter 41 on the imaging device 10 is complete.

Additionally, as described above, the filter holding member 40 and the jig 50 are connected to each other by the movable ball 51b of the jig 50 being fitted to the opening 45c of the filter holding member 40. Therefore, the jig 50 can be easily removed from the filter holding member 40 when in the state of (b) where another external force, that is, binding force from the retaining member 17, is applied to the filter holding member 40.

Here, a description will be given on a stop member 17b of the retaining member 17 and a hook portion 45d of the convex portion 45a of the filter holding member 40 which may be provided as additional configurations for mounting the filter holding member 40 on the imaging device 10.

The stop member 17b is provided at the part of the retaining member 17 other than the notch 17a. The stop member 17b is a pin member traversing the groove 19a (see FIG. 3) formed by the part of the retaining member 17 other than the notch 17a and the fixed filter frame 19, and there may be arranged two stop members 17b near each of the two notches 17a in such a way as to be point symmetrical, as shown in FIG. 7, for example.

The hook portion 45d is a notch, of the convex portion 45a, having a shape corresponding to the stop member 17b. In the illustrated example, when the filter holding member 40 is rotated clockwise from the state of (a), the filter holding member 40 rotates until it is in the state of (b). At this time, the stop member 17b moves over a protrusion formed by the hook portion 45d and is hooked to the hook portion 45d.

The clockwise rotation of the filter holding member 40 is thereby restricted. Accordingly, a case where the fitting of the filter holding member 40 to the groove 19a is released because the filter holding member 40 has rotated too much and the positions of the convex portion 45a and the notch 17a coincided again can be prevented. Furthermore, a user rotating the filter holding member 40 can get a click feeling, and can perceive that the filter holding member 40 entered a predetermined engagement state.

Additionally, to achieve such a configuration, the engagement portion 45 of the filter holding member 40 including the hook portion 45d is preferably formed of an elastically deformable material such as resin.

On the other hand, in the case of removing, in the illustrated example, the filter holding member 40 which has been mounted, the filter holding member 40 is rotated anticlockwise from the state of (b). In this case, the hooking of the stop member 17b and the hook portion 45d is released, and the filter holding member 40 rotates until it enters the state of (a). Here, the convex portions 45a at the top and bottom of the drawing abut against the stop members 17b, and the anticlockwise rotation of the filter holding member 40 is restricted. Accordingly, a case where removal of the filter holding member 40 is not achieved because the filter holding member 40 has rotated too much and the positions of the convex portion 45a and the notch 17a no longer coincide can be prevented.

Additionally, the stop member 17b and the hook portion 45d may be configured in various ways in addition to the examples described above. For example, it is possible to have only the stop member 17b provided. In this case, the stop member 17b exists solely for prevention of the filter holding member 40 rotating too much. Also, it is possible to have one stop member 17b provided at one part instead of two as illustrated, and the stop member 17b may have both the function of restricting clockwise rotation of the filter holding member 40 and the function of restricting anticlockwise rotation of the filter holding member 40. The shape of the stop member 17b is not limited to a pin shape, and may be any shape as long as the function described above can be realized. The stop member 17b does not necessarily have to completely traverse the groove 19a, and it may be a protrusion protruding from the retaining member 17 toward the groove 19a, for example.

(State where Filter is Mounted)

Figure 8:
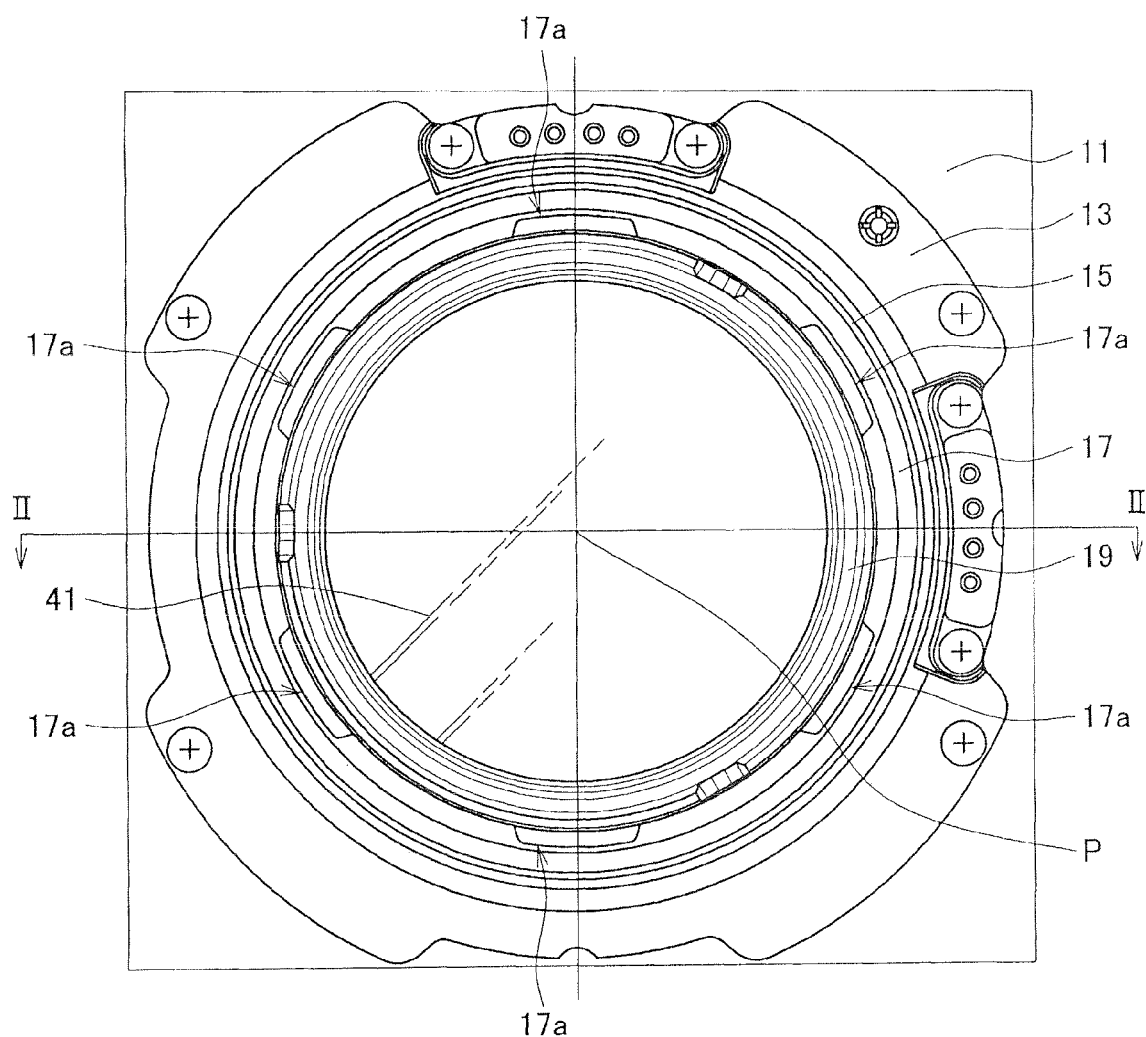
FIG. 8 is a diagram showing a configuration of a lens mount unit and its vicinity for a case where a filter holding member is mounted on an imaging device according to an embodiment of the present disclosure.
Figure 9:
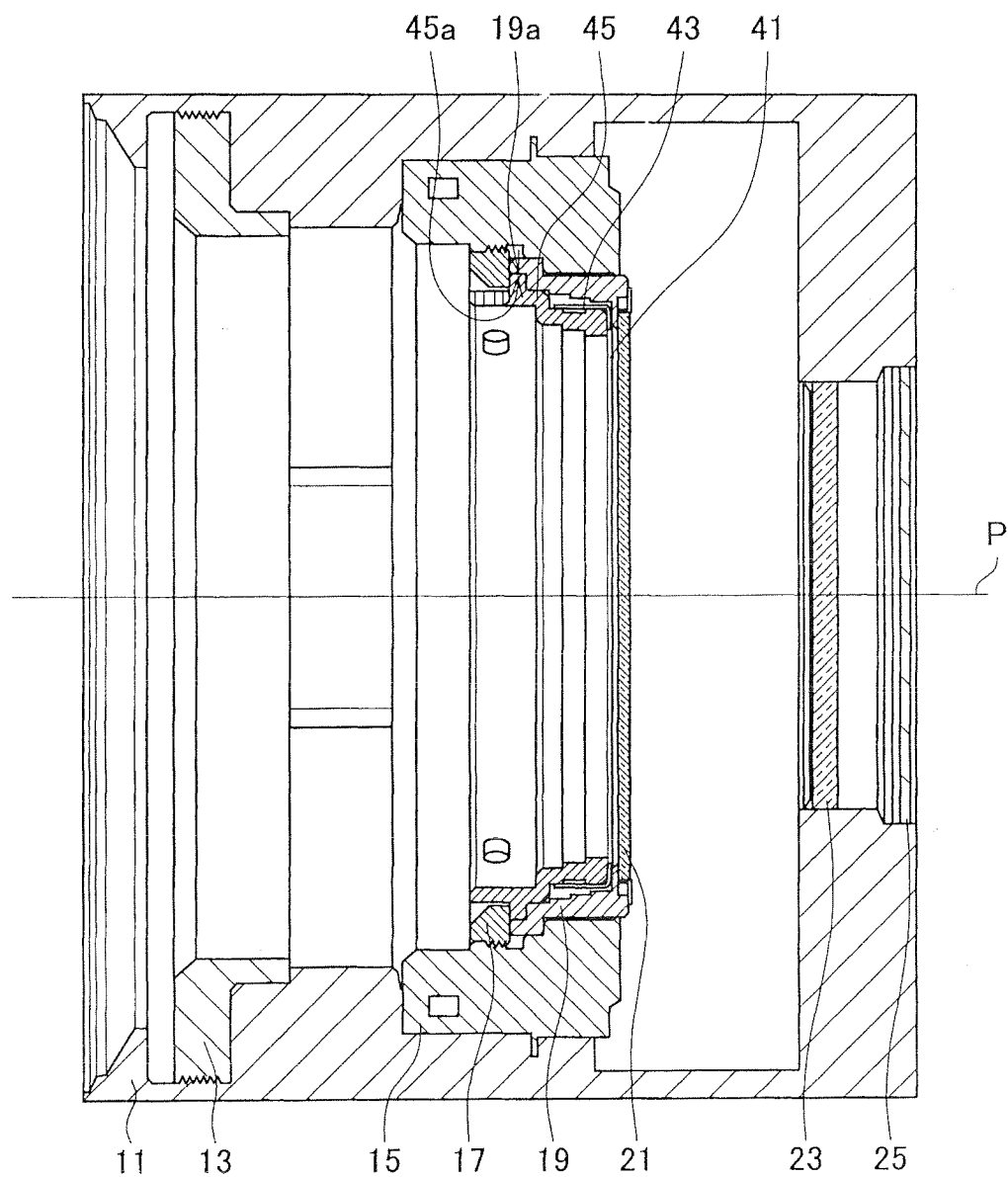
FIG. 9 is a cross-sectional view along the II-II line of the lens mount unit and its vicinity for a case where the filter holding member is mounted on the imaging device shown in FIG. 8.

FIG. 8 is a diagram showing a configuration of a lens mount unit and its vicinity for a case where a filter holding member is mounted on an imaging device according to an embodiment of the present disclosure. FIG. 9 is a cross-sectional view along the II-II line of the lens mount unit and its vicinity for a case where the filter holding member is mounted on the imaging device shown in FIG. 8. The configuration of the imaging device 10 shown in FIGS. 8 and 9 is the same as the configuration described above with reference to FIGS. 2 and 3. In the following description, the relationship between the filter holding member 40 mounted on the imaging device 10 and each member of the imaging device 10 will be mainly described.

Additionally, also in the description below, the lens mount unit 13 side, i.e. the subject side, will be described as the front, and the image sensor 25 side will be described as the rear.

As described above, the filter holding member 40 is stationary fixed to the imaging device 10 by the convex portion 45a formed on the engagement portion 45 being fitted to the groove 19a formed by the retaining member 17 and the fixed filter frame 19. To prevent back-and-forth swaying of the filter holding member 40 in this state, the thickness of the convex portion 45a is preferably formed to be close in value to the width of the groove 19a. Also, to prevent up-and-down and left-and-right swaying of the filter holding member 40, the outside diameter of the engagement portion 45, including the convex portion 45a, is preferably formed to be close in value to the inside diameter of the most anterior part of the fixed filter frame 19, i.e. the diameter of the bottom surface of the groove 19a. Or, the outside diameter of the part of the engagement portion 45 other than the convex portion 45a is preferably formed to be close in value to the inside diameter of the fixed filter frame 19 at the back of the groove 19a or the inside diameter of the part of the retaining member 17 other than the notch 17a.

At this time, as illustrated, the engagement portion 45 and the filter holding portion 43 of the filter holding member 40 are formed along the inner peripheral surfaces of the retaining member 17 and the fixed filter frame 19. The filter 41 held by the filter holding portion 43 is positioned immediately in front of the bandpass filter 21. That is, the inner peripheral surface of the filter holding member 40 mounted on the imaging device 10 forms a surface that covers the inside of the cylindrical surface formed by the retaining member 17 and the fixed filter frame 19. Accordingly, as illustrated, the inner peripheral surface of the engagement portion 45 of the filter holding member 40 may also be provided with steps which may function as light-shielding lines for preventing a lens flare or the like, as with the fixed filter frame 19.

As described above, a lens at the rearmost part of a lens unit to be mounted on the lens mount unit 13, that is, a so-called rear lens, sometimes projects more backward than the lens mount unit 13 and enters the space in front of the filter 41 in a state where the filter holding member 40 is mounted on the imaging device 10. As in the example illustrated, if the filter 41 is mounted immediately in front of the bandpass filter 21, the space for the rear lens mentioned above is less likely to be restricted by the mounting of the filter holding member 40. That is, in the present embodiment, the replacement filter 41 can be mounted while minimizing the restriction on the types of lens units that can be mounted on the lens mount unit 13.

(4. Supplement)

(Summary of Embodiment)

The embodiment of the present disclosure described above will be summarized.

According to an embodiment of the present disclosure, an imaging device includes an image sensor, and an engagement member which is an annular or cylindrical member provided between a lens mount unit and a first optical filter fixedly installed on a subject side of the image sensor, and has a second uneven portion formed in an inner circumferential direction, the second uneven portion having a shape corresponding to a first uneven portion formed on an outer periphery of a filter holding member for holding a second optical filter, and being for engaging the filter holding member in an attachable/detachable manner.

According to such a configuration, it is possible to install in an attachable/detachable manner, in an imaging device, a second optical filter (for example, an ND filter, a CC filter, a cross filter and the like), which is a replaceable filter, in an area in front of a first optical filter (for example, a bandpass filter, a low-pass filter and the like), which is installed in a stationary fixed manner between an image sensor and a lens mount unit. Here, an annular or cylindrical member, such as a fixed filter frame or a retaining member, for example, between the first optical filter and the lens mount unit is used as an engagement member, and an uneven portion for installing the second optical filter is formed on its inner periphery. Attaching or detaching the filter holding member by the unevenness formed on the inner periphery, that is, the unevenness in the circumferential direction around an optical axis, allows the shape of the filter holding member to be annular or cylindrical. The shape of the second optical filter to be held therein can thereby be made near circular, for example, and processing of the second optical filter is facilitated.

In the imaging device described above, the engagement member may have, as the second uneven portion, a groove to which a convex portion, which is the first uneven portion, is to be fitted.

According to such a configuration, the filter holding member can be engaged by a simple structure. A screw or the like may also be used for the configuration of the uneven portion, but the configuration described above has an advantage in that, unlike a screw, rotation does not have to be performed over and over, and also, in that one does not have to worry about a screw breaking due to too much rotation, for example. Additionally, in the configuration described above, the engagement member side is taken as being concave and the filter holding member side is taken as being convex, but the concave-convex relationship may be reversed.

In the imaging device described above, the engagement member may have a notch, formed on a side surface on a side of the lens mount unit of the groove, for guiding the convex portion to the groove.

According to such a configuration, the filter holding member inserted from the lens mount unit side can be smoothly guided to the groove. Also, by rotating the filter holding member after the convex portion has passed through the notch, and fitting and stationary fixing the convex portion to the groove, the filter holding member can be stationary fixed in a secure manner.

In the imaging device described above, the engagement member may have a stop portion, provided within the groove, for restricting rotation of the convex portion around an optical axis.

According to such a configuration, at the time of mounting the filter holding member, the filter holding member which has started rotating from a position where the convex portion passed through the notch rotating too much and the convex portion reaching again the position at which it will pass through the notch can be prevented. Also, at the time of removing the filter holding member, a filter which has rotated to a position where the convex portion would pass through the notch rotating too much and moving past the position can be prevented.

In the imaging device described above, the notch formed may be plural in number.

According to such a configuration, it is possible to set a plurality of angles (rotation angles around the optical axis) at which the convex portion of the filter holding member can pass through the notch. That is, a user does not have to greatly adjust the rotation angle at the time of mounting the filter holding member.

In the imaging device described above, the engagement member may include a first engagement member forming a bottom surface and a side surface, on a side of the image sensor, of the groove and a second engagement member forming a side surface, on a side of the lens mount unit, or the groove.

According to such a configuration, in the case where there are a plurality of members that can be the engagement member, it is possible to configure the engagement member by using members that are already used, for example, by configuring the groove by the members in a shared manner. For example, in the example of the imaging device described above as an embodiment, it is possible to obtain an engagement member on which a groove is formed by changing the shape of a retaining member (the second engagement member) according to the shape of an existing fixed filter frame (the first engagement member).

In the imaging device described above, the engagement member may include a first engagement member forming a bottom surface and both side surfaces of the groove.

According to such a configuration, the engagement member is configured from one member. For example, even when, in the configuration of the imaging device, a member corresponding to the fixed filter frame of the above-described example is stationary fixed singly to a substrate and a retaining member is not provided, if an uneven portion such as the groove is formed on the member corresponding to the fixed filter frame, a similar filter mounting structure can be realized. In this case, the bottom surface and the both side surfaces of the groove are formed by a single engagement member.

Furthermore, according to an embodiment of the present disclosure, a filter holding member includes a filter holding portion for holding an optical filter, and an engagement portion which is to be connected to the filter holding portion, whose first uneven portion formed on an outer periphery has a shape corresponding to a second uneven portion formed in an inner circumferential direction of an annular or cylindrical engagement member provided between a lens mount unit and a first optical filter fixedly installed on a subject side of an image sensor of an imaging device, and which is to be engaged with the second uneven portion in an attachable/detachable manner.

According to such a configuration, the filter holding member can be engaged with the imaging device by the first uneven portion formed on the outer periphery of the filter holding member. That is, an annular or cylindrical filter holding member does not have to have a structure for engagement that protrudes toward the inner periphery side, for example. Accordingly, the shape of an optical filter to be held by the filter holding member can be made near circular, for example, and processing of the optical filter is facilitated.

In the filter holding member described above, the engagement portion may have, as the first uneven portion, a convex portion for fitting to a groove, which is the second uneven portion.

According to such a configuration, the filter holding member can be engaged with an imaging device by a simple structure. A screw or the like may also be used for the configuration of the uneven portion, but the configuration described above has an advantage in that, unlike a screw, rotation does not have to be performed over and over, and also, in that one does not have to worry about a screw breaking due to too much rotation, for example. Additionally, in the configuration described above, the engagement member side is taken as being concave and the filter holding member side is taken as being convex, but the concave-convex relationship may be reversed.

In the filter holding member described above, the convex portion may be guided to the groove by a notch formed on a side surface, on a side of the lens mount unit, of the groove.

According to such a configuration, the filter holding member inserted from the side of the lens mount unit of the imaging device can be smoothly guided to the groove. Also, by rotating the filter holding member after the convex portion has passed through the notch, and fitting and stationary fixing the convex portion to the groove, the filter holding member can be stationary fixed in a secure manner to the imaging device.

In the filter holding member described above, the convex portion may have a hook portion for hooking to a stop portion, provided within the groove, for restricting rotation of the convex portion around an optical axis.

According to such a configuration, due to the hook portion hooking to the stop portion on the side of the imaging device when the filter holding member rotated to a predetermined position, a user who is rotating the filter holding member can get a click feeling, for example. The user can thereby perceive that the filter holding member entered a predetermined engagement state.

In the filter holding member described above, the convex portion formed may be plural in number.

According to such a configuration, it is possible to set a plurality of angles (rotation angles around the optical axis) at which the convex portion of the filter holding member can pass through the notch. That is, a user does not have to greatly adjust the rotation angle at the time of mounting the filter holding member.

Furthermore, according to an embodiment of the present disclosure, a filter mounting method for an imaging device is performed, the filter mounting method including inserting, between a lens mount unit and a first optical filter fixedly installed on a subject side of an image sensor of an imaging device, a filter holding member holding a second optical filter, the filter holding member being inserted in an optical axis direction from a side of the lens mount unit with the second optical filter facing the image sensor, and causing a second uneven portion formed on an outer periphery of the filter holding member to be engaged, in an attachable/detachable manner, with a first uneven portion formed in an inner circumferential direction of an annular or cylindrical engagement member provided between the first optical filter and the lens mount unit.

According to such a procedure, a filter holding member can be inserted and mounted at the back of the lens mount unit from the outside of the imaging device at a predetermined orientation. A jig whose shape corresponds to the shape of the filter holding member may be provided to facilitate the mounting.

(Remark)

It should be understood by those skilled in the art that various modifications, combinations, sub-combinations and alterations may occur depending on design requirements and other factors insofar as they are within the scope of the appended claims or the equivalents thereof.

Additionally, the following configurations are also within the scope of the present disclosure.

(1) An imaging device including:
an image sensor; and
an engagement member which is an annular or cylindrical member provided between a lens mount unit and a first optical filter fixedly installed on a subject side of the image sensor, and has a second uneven portion formed in an inner circumferential direction, the second uneven portion having a shape corresponding to a first uneven portion formed on an outer periphery of a filter holding member for holding a second optical filter, and being for engaging the filter holding member in an attachable/detachable manner.

(2) The imaging device according to (1), wherein the engagement member has, as the second uneven portion, a groove to which a convex portion, which is the first uneven portion, is to be fitted.

(3) The imaging device according to (2), wherein the engagement member has a notch, formed on a side surface on a side of the lens mount unit of the groove, for guiding the convex portion to the groove.

(4) The imaging device according to (3), wherein the engagement member has a stop portion, provided within the groove, for restricting rotation of the convex portion around an optical axis.

(5) The imaging device according to (3) or (4), wherein the notch formed is plural in number.

(6) The imaging device according to any of (2) to (5), wherein the engagement member includes a first engagement member forming a bottom surface and a side surface, on a side of the image sensor, of the groove and a second engagement member forming a side surface, on a side of the lens mount unit, of the groove.

(7) The imaging device according to any of (2) to (5), wherein the engagement member includes a first engagement member forming a bottom surface and both side surfaces of the groove.

(8) A filter holding member including:
a filter holding portion for holding an optical filter; and
an engagement portion which is to be connected to the filter holding portion, whose first uneven portion formed on an outer periphery has a shape corresponding to a second uneven portion formed in an inner circumferential direction of an annular or cylindrical engagement member provided between a lens mount unit and a first optical filter fixedly installed on a subject side of an image sensor of an imaging device, and which is to be engaged with the second uneven portion in an attachable/detachable manner.

(9) The filter holding member according to (8), wherein the engagement portion has, as the first uneven portion, a convex portion for fitting to a groove, which is the second uneven portion.

(10) The filter holding member according to (9), wherein the convex portion is guided to the groove by a notch formed on a side surface, on a side of the lens mount unit, of the groove.

(11) The filter holding member according to (10), wherein the convex portion has a hook portion for hooking to a stop portion, provided within the groove, for restricting rotation of the convex portion around an optical axis.

(12) The filter holding member according to (10) or (11), wherein the convex portion formed is plural in number.

(13) A filter mounting method for an imaging device, including:
inserting, between a lens mount unit and a first optical filter fixedly installed on a subject side of an image sensor of an imaging device, a filter holding member holding a second optical filter, the filter holding member being inserted in an optical axis direction from a side of the lens mount unit with the second optical filter facing the image sensor; and
causing a second uneven portion formed on an outer periphery of the filter holding member to be engaged, in an attachable/detachable manner, with a first uneven portion formed in an inner circumferential direction of an annular or cylindrical engagement member provided between the first optical filter and the lens mount unit.

The present application contains subject matter related to that disclosed in Japanese Priority Patent Application JP 2011-164319 filed in the Japan Patent Office on Jul. 27, 2011, the entire content of which is hereby incorporated by reference.

What is claimed is:

1. An imaging device comprising:
an image sensor;
an engagement member which is an annular or cylindrical member provided between a fixed lens mount unit and a first optical filter fixedly installed on a subject side of the image sensor,
an annular or cylindrical filter holding member for holding a second optical filter and disposed in abutting relationship with the engagement member and having a stepped portion cooperating with the engagement member to form a groove in an inner circumferential direction, said filter holding member having a convex portion formed on an outer periphery of the filter holding member to be received by and fit within said groove, the engagement member engaging the filter holding member in an attachable/detachable manner, the engagement member having a notch, formed on a side surface on a side of the lens mount unit of the groove, for guiding the convex portion to the groove; and a stop element disposed within the groove and adapted to be contacted by the convex portion when the filter member is rotated in the groove, thereby restricting rotation of the convex portion around an optical axis.

2. The imaging device according to claim 1, wherein the notch formed is plural in number.

3. The imaging device according to claim 1, wherein the engagement member includes a first engagement member forming a bottom surface and both side surfaces of the groove.

4. A filter holding member comprising:

a filter holding portion for holding an optical filter; and an engagement portion configured for connection to the filter holding portion, the filter holding portion having a convex portion formed on an outer periphery, the filter holding portion being disposed in abutting relationship with an annular or cylindrical engagement member provided between a fixed lens mount unit and a first optical filter fixedly installed on a subject side of an image sensor of an imaging device, the filter holding portion, having a stepped portion cooperating with the engagement member to form a groove in an inner circumferential direction for receiving the convex portion, that fits into the groove, the engagement member and the filter holding portion being connectable in an attachable/detachable manner;

the engagement member having a notch, formed on a side surface on a side of the lens mount unit of the groove, for guiding the convex portion to the groove; and a stop element disposed within the groove and adapted to be contacted by the convex portion when the filter member is rotated in the groove, thereby restricting rotation of the convex portion around an optical axis.

5. The filter holding member according to claim 4, wherein the convex portion has a hook portion for hooking to the stop portion.

6. The filter holding member according to claim 4, wherein the convex portion formed is plural in number.

7. A filter mounting method for an imaging device, comprising:

inserting, between a fixed lens mount unit and a first optical filter fixedly installed on a subject side of an image sensor of an imaging device, a filter holding member holding a second optical filter, the filter holding member being inserted in an optical axis direction from a side of the lens mount unit with the second optical filter facing the image sensor;

causing a convex portion formed on an outer periphery of the filter holding member to be engaged, in an attachable/detachable manner, with a groove formed in an inner circumferential direction of an annular or cylindrical engagement member and defined by an abutment of the filter holding member to the engagement member, the engagement member being provided between the first optical filter and the lens mount unit; and selectively stopping rotation of the filter member in the groove by contacting with the convex portion a stop element disposed within the groove when the filter member is rotated in the groove.

\* \* \* \* \*